(12) United States Patent
Enssle et al.

(10) Patent No.: US 10,810,544 B2
(45) Date of Patent: *Oct. 20, 2020

(54) DISTRIBUTED AUTONOMOUS ROBOT SYSTEMS AND METHODS

(71) Applicant: Walmart Apollo, LLC, Bentonville, AR (US)

(72) Inventors: Benjamin D. Enssle, Bella Vista, AR (US); David Blair Brightwell, Bentonville, AR (US); Greg A. Bryan, Bentonville, AR (US); Cristy Crane Brooks, Cassville, MO (US); Howard Gabbert, Rogers, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 132 days.

This patent is subject to a terminal disclaimer.

(21) Appl. No.: 16/110,730

(22) Filed: Aug. 23, 2018

(65) Prior Publication Data

US 2018/0365632 A1 Dec. 20, 2018

Related U.S. Application Data

(63) Continuation of application No. 15/587,113, filed on May 4, 2017, now Pat. No. 10,083,418.

(Continued)

(51) Int. Cl.
*G06Q 10/08* (2012.01)
*G06K 7/10* (2006.01)
(Continued)

(52) U.S. Cl.
CPC ........... *G06Q 10/087* (2013.01); *B25J 9/162* (2013.01); *B25J 9/1694* (2013.01); *B25J 19/023* (2013.01);
(Continued)

(58) Field of Classification Search
CPC .................................................. G06K 7/10861
See application file for complete search history.

(56) References Cited

U.S. PATENT DOCUMENTS 7,222,786 B2 5/2007 Renz et al.
7,660,739 B2 2/2010 Fowler
(Continued)

FOREIGN PATENT DOCUMENTS

EP 1901215 A1 3/2008

OTHER PUBLICATIONS

International Search Report and Written Opinion from related inteternational patent application serial No. PCT/US2017/031090 dated Jul. 17, 2017.

*Primary Examiner* — Thomas Randazzo
(74) *Attorney, Agent, or Firm* — McCarter & English, LLP

(57) ABSTRACT

Described in detail herein are systems and methods for detecting absent like physical objects at a first facility and replenishing the like physical objects from the second facility to the first facility. The system includes an autonomous robot device configured to detect absent like physical objects at a first facility and transmit an identifier associated with the like physical objects to a first computing system. The first computing system determines the need for the addition of the like physical objects in the first facility and transmits the data associated with the like physical objects to the second computing system. The second computing system corrects a perpetual inventory error associated with the like physical objects based on the received data and transmits instructions to an autonomous robot picker disposed at a second facility to replenish the like physical objects at the first facility. The autonomous robot picker locates, picks up and carries the like physical objects at the second facility to a conveyer belt.

(Continued)

The like physical objects are transported from the second facility to the first facility.

20 Claims, 8 Drawing Sheets

Related U.S. Application Data

(60) Provisional application No. 62/331,647, filed on May 4, 2016.

(51) Int. Cl.
| | | |
|---|---|---|
| *B25J 9/16* | (2006.01) | |
| *G05B 19/418* | (2006.01) | |
| *B25J 19/02* | (2006.01) | |
| *G05B 15/02* | (2006.01) | |
| *G06K 9/32* | (2006.01) | |

(52) U.S. Cl.
CPC ....... *G05B 15/02* (2013.01); *G05B 19/41895* (2013.01); *G06K 7/10297* (2013.01); *G06K 7/10861* (2013.01); *G06K 9/3241* (2013.01); *G05D 2201/0207* (2013.01); *G06K 2007/10504* (2013.01); *Y10S 901/01* (2013.01)

(56) References Cited

U.S. PATENT DOCUMENTS

| | | | | |
|---|---|---|---|---|
| 8,380,652 | B1 | 2/2013 | Francis, Jr. | |
| 9,171,415 | B2 | 10/2015 | Adams et al. | |
| 9,205,886 | B1* | 12/2015 | Hickman | G05D 1/0246 |
| 9,415,935 | B1* | 8/2016 | Macfarlane | B65G 1/1373 |
| 9,505,554 | B1* | 11/2016 | Kong | H04N 5/23212 |
| 9,549,125 | B1* | 1/2017 | Goyal | H04N 5/23212 |
| 9,691,151 | B1* | 6/2017 | Anderson-Sprecher | G06T 7/344 |
| 9,908,702 | B2* | 3/2018 | Elazary | B65G 1/1375 |
| 10,083,418 | B2* | 9/2018 | Enssle | G06K 7/10297 |
| 2003/0126352 | A1* | 7/2003 | Barrett | G06F 12/0269 |
| | | | | 711/100 |
| 2003/0196873 | A1* | 10/2003 | Kelly | B65G 67/08 |
| | | | | 198/618 |
| 2004/0158507 | A1 | 8/2004 | Meek et al. | |
| 2006/0290779 | A1 | 12/2006 | Reverte et al. | |
| 2007/0023512 | A1 | 2/2007 | Miller et al. | |
| 2007/0042716 | A1 | 2/2007 | Goodall et al. | |
| 2008/0077511 | A1* | 3/2008 | Zimmerman | G06Q 10/00 |
| | | | | 705/28 |
| 2009/0063307 | A1* | 3/2009 | Groenovelt | G06Q 10/087 |
| | | | | 705/28 |
| 2010/0042439 | A1 | 2/2010 | Martinez et al. | |
| 2010/0171826 | A1* | 7/2010 | Hamilton | G06Q 30/06 |
| | | | | 348/135 |
| 2011/0288684 | A1* | 11/2011 | Farlow | G05D 1/0038 |
| | | | | 700/264 |
| 2014/0037417 | A1* | 2/2014 | Hancock | G07F 11/165 |
| | | | | 414/751.1 |
| 2014/0247116 | A1* | 9/2014 | Davidson | G06Q 10/087 |
| | | | | 340/10.1 |
| 2014/0279294 | A1* | 9/2014 | Field-Darragh | H04B 5/0062 |
| | | | | 705/28 |
| 2014/0344118 | A1 | 11/2014 | Parpia et al. | |
| 2015/0142252 | A1 | 5/2015 | Hutson | |
| 2015/0365660 | A1* | 12/2015 | Wu | G05D 1/0234 |
| | | | | 348/158 |
| 2016/0260161 | A1* | 9/2016 | Atchley | G06T 7/74 |
| 2017/0072563 | A1* | 3/2017 | Anderson-Sprecher | G01B 11/14 |
| 2017/0110017 | A1 | 4/2017 | Kimchi et al. | |
| 2017/0193434 | A1* | 7/2017 | Shah | G05D 1/0212 |
| 2017/0262724 | A1* | 9/2017 | Wu | G06T 7/0004 |
| 2017/0270475 | A1* | 9/2017 | Cohen | H04N 5/247 |
| 2017/0286901 | A1* | 10/2017 | Skaff | G06K 9/3216 |

\* cited by examiner

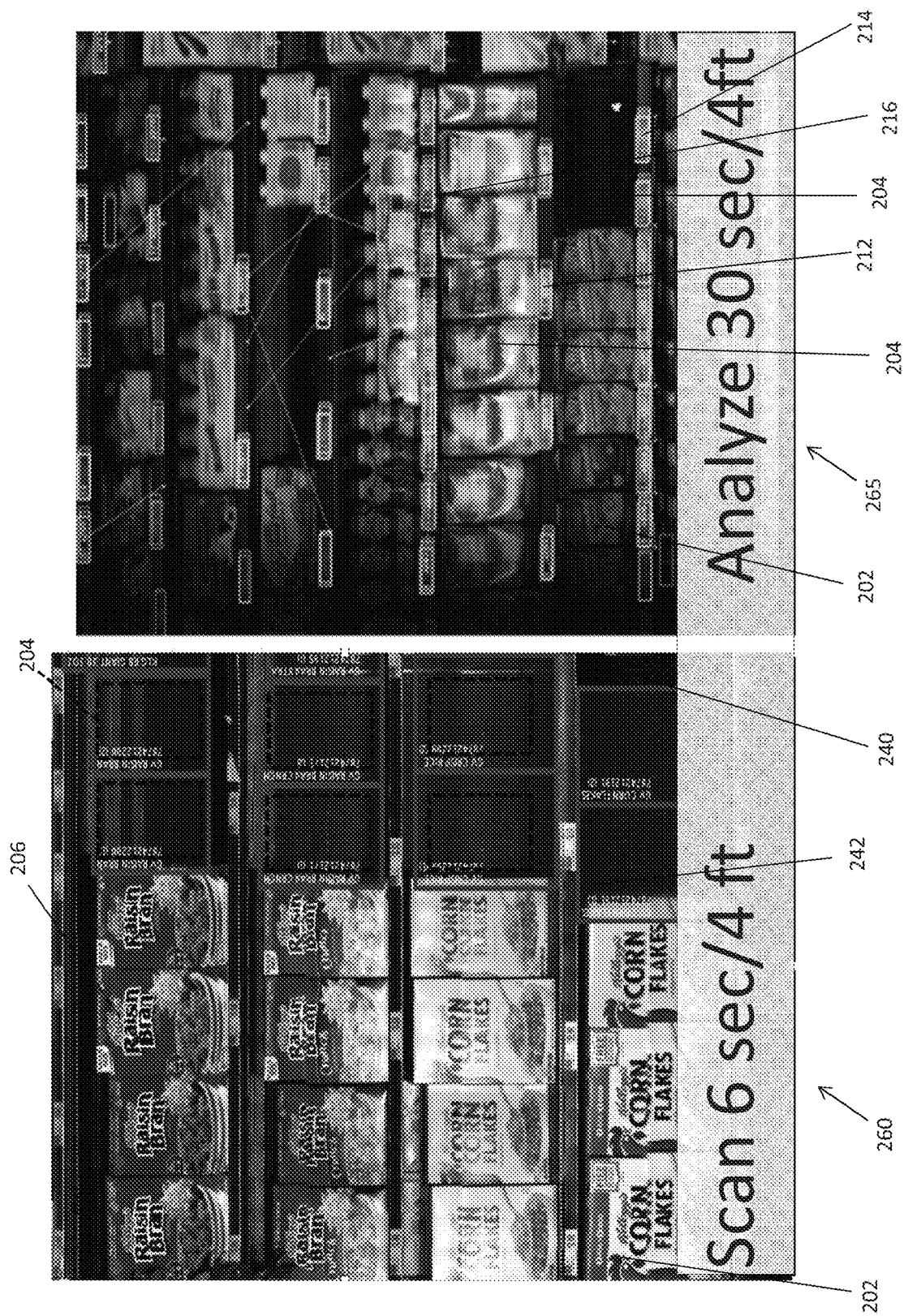

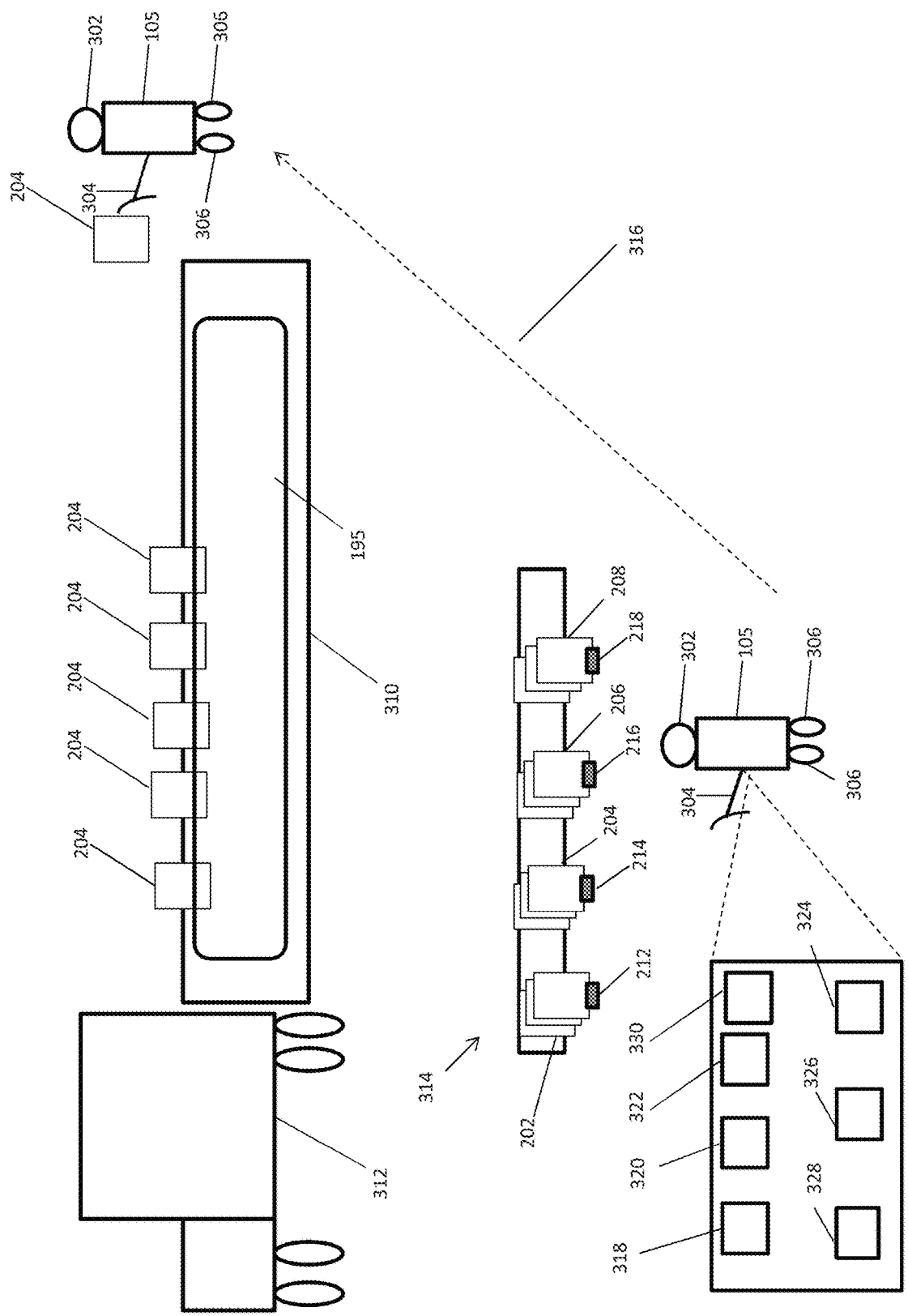

DISTRIBUTED AUTONOMOUS ROBOT SYSTEMS AND METHODS

CROSS-REFERENCE TO RELATED PATENT APPLICATIONS

This application is a continuation application of U.S. application Ser. No. 15/587,113 filed on Apr. 12, 2017 which claims priority to U.S. Provisional Application No. 62/331,647 filed on May 4, 2016, the contents each of the applications are hereby incorporated by reference in their entirety.

BACKGROUND

Updating sets of physical objects and maintaining accurate data associated with the sets of physical object can be difficult, particularly where the status of the sets of physical objects are constantly changing. While some of the data can be updated and/or maintained through normal processes, errors can occur when elements from the sets of physical objects are not channeled through normal processes.

BRIEF DESCRIPTION OF DRAWINGS

Illustrative embodiments are shown by way of example in the accompanying drawings and should not be considered as a limitation of the present disclosure:

FIGS. 2B-2C depict images captured by an embodiment of the autonomous robot device in the storage units according to an exemplary embodiment of the present disclosure;

FIG. 3 is a block diagrams illustrating another autonomous robot device in an autonomous system according to exemplary embodiments of the present disclosure;

DETAILED DESCRIPTION

Figure 1:
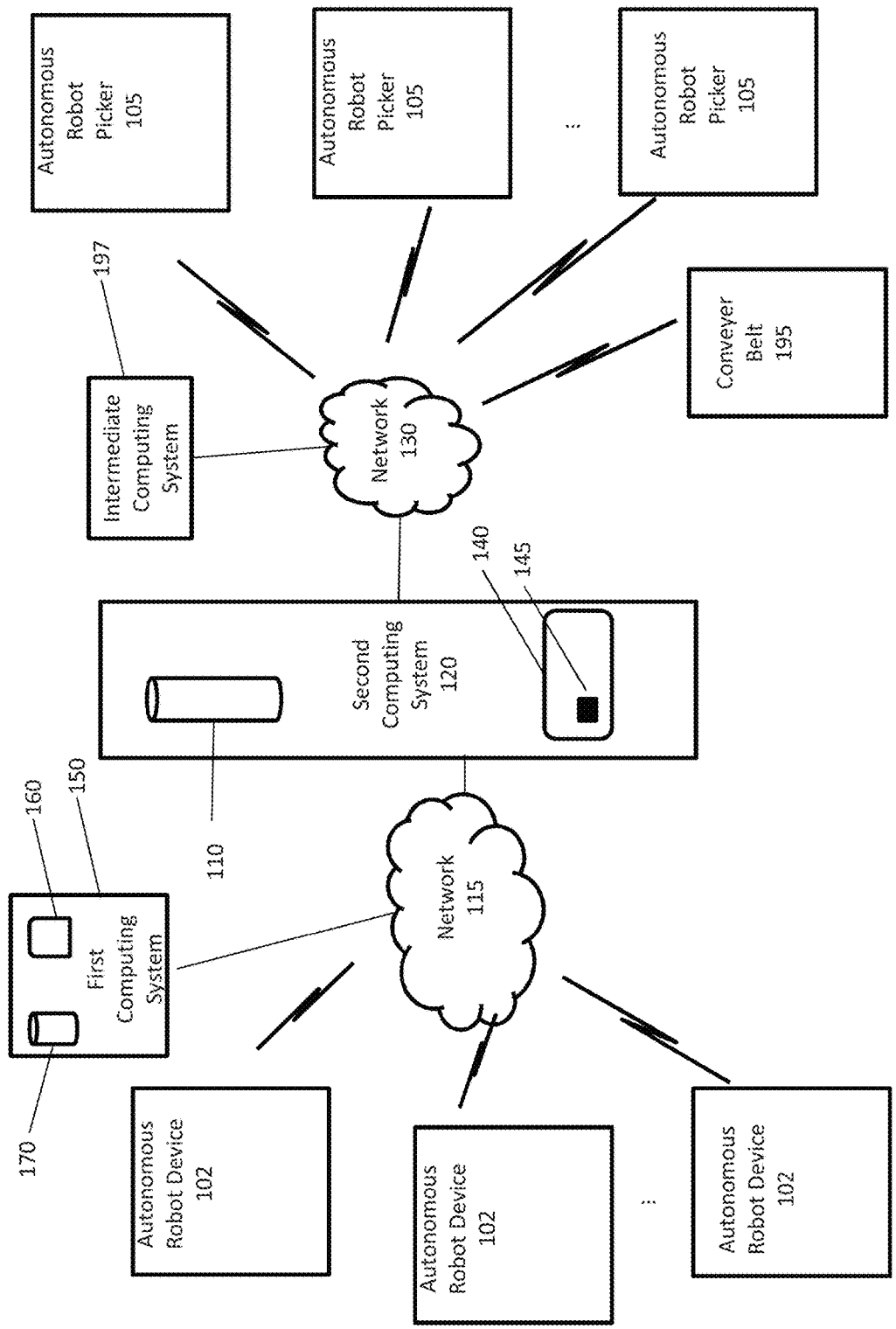
FIG. 1 illustrates an exemplary autonomous robot system in accordance with exemplary embodiments of the present disclosure.

Described in detail herein are autonomous robot systems and methods. The autonomous robot systems and methods can include autonomous robot devices, and the autonomous robot devices associated with a first set of autonomous robot devices can each include a controller, a drive motor, and an image capturing device roaming autonomously through a first facility. The autonomous robot devices associated with the first set can autonomously roam or navigate through a first facility in response to operation of the drive motor by the controller. For example, the autonomous robot devices associated with the first set can include one or more wheels, tracks, propellers, rotor systems (including rotor blades), and the like.

The autonomous robot devices associated with the first set can scan the environment within which they roam to detect and capture images of locations within the first facility at which sets of like physical objects are supposed to be disposed. Using the image capturing device, the autonomous robot devices can detect that the like physical objects of a set of like physical objects are absent from a first location based on the images captured by the image capturing devices. When one of the autonomous robot devices reads an identifier at the first location that is associated with the set of like physical objects, the autonomous robot device can wirelessly transmit the identifier to a first computing system that includes at least one server and a first database. In exemplary embodiments, the autonomous robot devices of the first set can detect the set of like physical objects are absent from the first location within the facility using machine vision and/or video analytics. In exemplary embodiments, the autonomous robot devices of the first set can include optical machine scanners, and the identifier can be an optical machine readable representation that is readable by the optical machine scanners. For example, when an autonomous robot device of the first set detect the absence of like physical objects using the image capturing device, the autonomous robot device can locate the identifier (e.g., using images from the image capturing device) and the controller of the autonomous robot device can control the optical machine scanner to read the identifier.

The first computing system can store data in the first database in response to receipt of the identifier from the autonomous robot device. The data can indicate a need to add more of the like physical objects to the set at the first location in response to receipt of the identifier from the autonomous robot device. The first computing system can transmit the data associated with the like physical objects stored in the first database from the first computing system to a remotely located second computing system.

The second computing system can receive the data associated with the like physical objects and, based. at least in part on the data, the second computing system can correct an error associated a quantity of the like physical objects at the first facility. After correcting the error, the second computing system can transmit the correction to the first computing system.

In some instances, the correction of the error can trigger the second computing system to transmit instructions to autonomous robot devices associated with a second set of autonomous robot devices disposed in a second facility. In some embodiments, an intermediary computing system can provide an interface between the second computing system and the autonomous robot devices associated with the second set. The second computing system (e.g., via the intermediate computing system) can control an operation of a conveyer belt disposed in the second facility. At least one of the autonomous robot devices can autonomously navigate through the second facility to a storage location for the like physical objects in the second facility in response to the instructions from the second computing system. The autonomous robot device can include at least one picking unit and can autonomously control the picking unit to remove at least one of the like physical objects from the storage location and can autonomously control the picking unit to place the at least one of the like physical objects on the conveyer belt to transport the at least one of the like physical objects from the storage location to a distribution location in the second facility.

In exemplary embodiments, the first and/or second computing systems can determine whether like physical objects associated with the set of like physical objects are present in a second location within the first facility based on data retrieved from one or more databases.

In exemplary embodiments, the first computing system can determine whether the identifier, e.g., at the first location, has been read more than a specified quantity of times within a specified time period. The first computing system is configured to determine that the same identifier has been read by two of the plurality of autonomous robot devices within a specified time period. The first computing system deletes subsequent/redundant reads that occur within the specified time period.

FIG. 1 illustrates an exemplary autonomous robot system in accordance with exemplary embodiments of the present disclosure. In exemplary embodiments, the system 100 includes a first computing system 150, a second computing system 120, autonomous robot devices 102, autonomous robot pickers 105, and a conveyor belt 195. The system 100 can be geographically distributed such that at least the autonomous robot devices 102 and the autonomous robot devices 105 are located in separate facilities. In some embodiments, the autonomous robot device 102 and the first computing system can be located in a first facility, the autonomous robot pickers 105 can be located in a second facility, and the second computing device 120 can be located in a third facility. In exemplary embodiments, the autonomous robot devices 102 can autonomously roam or navigate through a first facility to detect and report issues associated with the first facility to the first computing system 150. The first computing system can transmit data associated with the issues the second computing device 120, which can trigger corrective actions to mitigate and/or eliminate the issues identified by the autonomous robot device 102. In some instances, to mitigate and/or reduce the issues at the first facility, the second computing system 120 can transmit instructions to the autonomous robot pickers 105 in a second facility to trigger one or more autonomous actions by the autonomous robot pickers 105, as described herein.

The first computing system 150 can include a first server 160 and a first database 170. The first database 170 may store data including, but not limited to, names of physical objects, locations of physical objects, quantities of physical objects, and a perpetual inventory value associated with physical objects. The first server 160 can be in communication with the autonomous robot devices 102 via one or more communication channels to receive data and/or instructions from the autonomous robot device 102 and/or to transmit data and/or instructions to the autonomous robot device 102. The first server 160 can interact with the database 170 to store data in and retrieve data from the database 170. The server 160 can also execute an automated batch file to transmit data stored in the database 170 to the second computing device 120 via a network 115.

The second computing system 120 may include a second database 110 and a second server 140. The second database may include data associated with physical objects located at various facilities including names of physical objects, locations of physical objects, quantities of physical objects and a perpetual inventory value associated with physical objects at the first facility. The second server 140 can be in communication with the autonomous robot devices 105 and the conveyor belt 195 via one or more communication channels to receive data and/or instructions from the autonomous robot device 105 and/or to transmit data and/or instructions to the autonomous robot device 105 (e.g., via a network 130 and/or an intermediate computing system 197). The second server 140 can interact with the database 110 to store data in and/or retrieve data from the database 110. The second server 140 can execute a correction application 145 to correct any error associated with the quantity of physical objects present at the first facility.

In an example embodiment, one or more portions of first and second network 115 and 130 may be an ad hoc network, an intranet, an extranet, a virtual private network (VPN), a local area network (LAN), a wireless LAN (WLAN), a wide area network (WAN), a wireless wide area network (WWAN), a metropolitan area network (MAN), a portion of the Internet, a portion of the Public Switched Telephone Network (PSTN), a cellular telephone network, a wireless network, a WiFi network, a WiMax network, any other type of network, or a combination of two or more such networks.

The autonomous robot devices 102 and autonomous robot pickers 105 can be, but are not limited to, driverless vehicles, unmanned aerial vehicles (e.g., drones), and/or any other suitable autonomous robot configured to autonomously roam and/or navigate through a facility and to perform the functions, operations, and actions described herein. The autonomous robot device 102 can be programmed with a map of the facility and/or can generate a map of the first facility using simultaneous localization and mapping (SLAM). Likewise, the autonomous robot pickers 105 can be programmed with a map of the second facility and/or can generate a map of the second facility using simultaneous localization and mapping (SLAM).

In operation of exemplary embodiments of the system 100, the autonomous robot devices 102 can determine like physical objects absent from a first location in a first facility. For example, the autonomous robot device 102 can roam a first facility and capture images of physical objects disposed in the first facility using an image capturing device. For example, the autonomous robot device 102 can be programmed with a map of the facility and/or can generate a map of the facility using simultaneous localization and mapping (SLAM), and can roam or navigate through the facility based on the map where the current location of the autonomous robot device 102 can be determined by the autonomous robot device based on an inertial navigation system, a GPS receiver, triangulation of wireless transmission in the facility, e.g., via WiFi access points. The autonomous robot device 102 can detect from the captured images, like physical objects absent from a first location in the first facility at which the like physical objects are supposed to be disposed and can capture identifiers associated with the physical objects disposed at the first location, e.g., via the image capturing device and/or an optical scanner. For example, the autonomous robot device 102 can capture images of the physical objects throughout the first facility and detect absent physical objects and extract the identifier for the physical object from an image using machine vision. As a non-limiting example, the autonomous robot device 102 can retrieve an image of a physical object in the first facility stored in a database 170 of the first computing system 150. The autonomous robot device 102 can compare an image of the absent physical object with the retrieved image of the physical object at the first facility and determine the physical object is absent from the first facility. The types of machine vision used by the autonomous robot device 120 can be but are not limited to: Stitching/Registration, Filtering, Thresholding, Pixel counting, Segmentation, Inpainting, Edge detection, Color Analysis, Blob discovery & manipulation, Neural net processing, Pattern recognition, Barcode Data Matrix and "2D barcode" reading, Optical character recognition and Gauging/Metrology. The autonomous robot device 102 can transmit the identifier of the absent like physical objects to the first computing system 150.

The first computing system 150 can query the database 170 using the identifier to retrieve data corresponding to the expected quantity of the like physical objects in the first facility. In some embodiments, the first computing system 150 can determine that there is a need for more of the like physical objects in the first facility. The first computing system 150 can store the data associated with the like physical objects in the first database 170 indicating the need to add the like physical objects to the set of like physical objects disposed at the first location in the first facility. Upon the execution of the automated batch file in the first server 160, the first computing system 150 can transmit the data associated with the identifier associated with the like physical objects as well as the identifier to the second computing system 120 via the first network 115. The automated batch file can be executed periodically by the first server 160.

In some embodiments, the first computing system 150 can receive the same identifier associated with the same like physical objects a subsequent time from the same autonomous robot device 102. The first computing system 150 can determine the identifier has previously been received within a predetermined period of time and can disregard the identifier received a subsequent time from the autonomous robot device 102.

In some embodiments, the first computing system 150 can receive the same identifier associated with the same like physical objects a subsequent time from a different autonomous robot device, such as the autonomous robot device 102. The first computing system 150 can determine the identifier has previously been received within a predetermined period of time and can disregard the identifier received from the autonomous robot device 102.

In some embodiments, the first computing system 150 can determine there are like physical objects located at a second location within the first facility and there is no need for more like physical objects.

The second server 140 can execute the Correction application 145 upon receiving the data associated with the identifier corresponding to the like physical objects. The Correction application 145 can query the second database 110 to retrieve the perpetual inventory value associated with the like physical objects for the first facility. The perpetual inventory value can be a numerical value indicating the expected inventory of physical objects available at the first facility. For example, if the perpetual inventory value associated with the like physical objects at the first facility indicates a perpetual inventory of 10 like physical objects, the Correction application 145 can determine that there is a perpetual inventory error of ten (10) in response to determining there are actually zero (0) like physical objects at the first facility. The Correction application 145 can correct the perpetual inventory error by changing the perpetual inventory value to zero (0) so that the perpetual inventory value indicates that the like physical objects are not present at the first facility. The Correction application 145 can transmit the corrected perpetual inventory value to the first computing system 150.

Upon correcting the perpetual inventory error, the second computing system 120 can transmit instructions to one or more autonomous robot pickers 105 and the conveyer belt 195 in the second facility, e.g., via the intermediate computing system 197. The instructions can control the operation of the conveyer belt 195 disposed in the second facility the autonomous robot pickers 105 disposed in the second facility. For example, the instructions can control the conveyer belt 195 and one or more of the autonomous robot pickers 105 to autonomously retrieve the like physical objects from a storage location in the second facility. The instructions can include the data associated with the like physical objects including a name of the like physical objects, a description of the like physical objects, coordinates corresponding to a location at which the physical objects are stored within the second facility, an identifier associated with the like physical objects, and a quantity of like physical objects to be retrieved from the storage location. Upon receipt of the instructions, the autonomous robot picker 105 can autonomously navigate to the storage location in which the like physical objects are disposed using the coordinates included in the instructions. In some embodiments, the autonomous robot picker 105 can read identifiers associated with various physical objects within the second facility and determine the location of the like physical objects using the identifiers in conjunction with or instead of using the coordinates. Upon finding the like physical objects, the autonomous robot picker 105 can pick up the like physical objects, carry the like physical objects from the storage location to the conveyer belt 195 and place the like physical objects on the conveyer belt 195. The like physical objects can be transported to the first facility from the second facility.

Figure 2A:
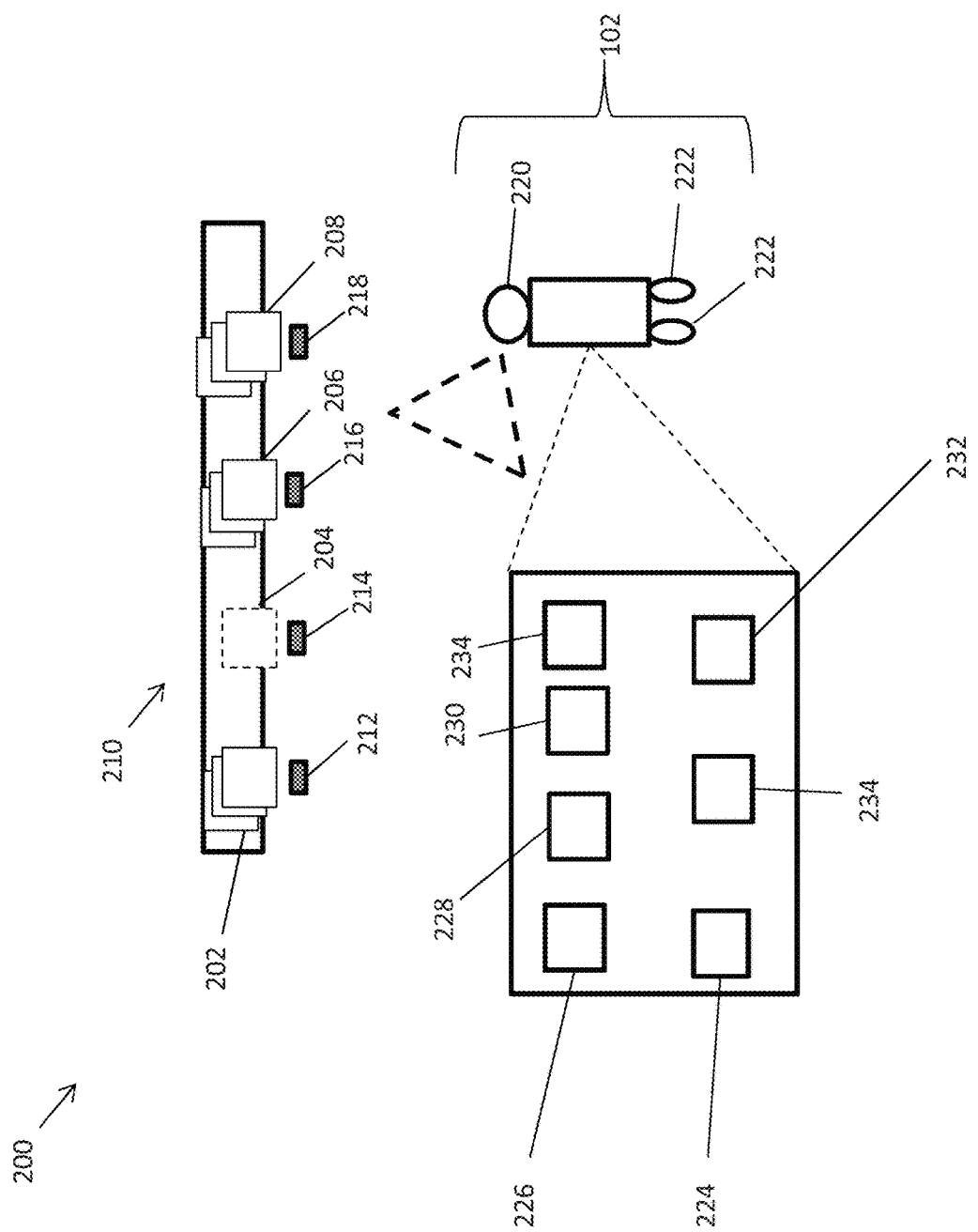
FIG. 2A is a block diagram illustrating an autonomous robot device in an autonomous robot system according to exemplary embodiments of the present disclosure.

FIG. 2A is a block diagram illustrating an embodiment of the autonomous robot device 102. The autonomous robot device 102 can be used to implement embodiments of the autonomous robot devices 102 shown in FIG. 1. In exemplary embodiments, the autonomous robot device 102 can be a driverless vehicle, an unmanned aerial craft, and/or the like. The autonomous robot device 102 can include an image capturing device 220, motive assemblies 222, a controller 224, an optical scanner 234, a drive motor 226, a GPS receiver 228, accelerometer 230 and a gyroscope 232, and can be configured to roam autonomously through a first facility 200. The autonomous robot device 102 can be and intelligent device capable of performing tasks without human control. The controller 224 can be programmed to control an operation of the image capturing device 220, the optical scanner 234, the drive motor 226, the motive assemblies 222 (e.g., via the drive motor 226), in response to various inputs including inputs from the GPS receiver 228, the accelerometer 230, and the gyroscope 232. The drive motor 226 can control the operation of the motive assemblies 222 directly and/or through one or more drive trains (e.g., gear assemblies and/or belts). In this non-limiting example, the motive assemblies 222 are wheels affixed to the bottom end of the autonomous robot device 102. The motive assemblies 222 can be but are not limited to wheels, tracks, rotors, rotors with blades, and propellers. The motive assemblies 222 can facilitate 360 degree movement for the autonomous robot device 102. The image capturing device 220 can be a still image camera or a moving image camera.

The controller 224 of the autonomous robot device 102 can be configured to control the drive motor 226 to drive the motive assemblies 222 so that the autonomous robot device 102 can autonomously navigate through the first facility 200 based on inputs from the GPS receiver 228, accelerometer 230 and gyroscope 232. The GPS receiver 228 can be a L-band radio processor capable of solving the navigation equations in order to determine a position of the autonomous robot device 102, determine a velocity and precise time (PVT) by processing the signal broadcasted by GPS satellites. The accelerometer 230 and gyroscope 232 can determine the direction, orientation, position, acceleration, velocity, tilt, pitch, yaw, and roll of the autonomous robot device 102. In exemplary embodiments, the controller can implement one or more algorithms, such as a Kalman filter, for determining a position of the autonomous robot device The first facility 200 can have sets of physical objects 202-208 disposed around the facility in a first location 210. The sets of physical objects 202-208 can have respective identifiers 212-218 associated with the sets physical objects 202-208. The identifiers 212-218 can be optical machine readable representations such as bar codes or QR codes. Each set physical object of physical objects 202-208 can be different than the other sets of physical objects 202-108. Each set of physical objects 202-208 can contain multiple like physical objects.

The autonomous robot device 102 can roam in the first facility 200 using the motive assemblies 222 and the controller 224 can control the image capturing device 220 to capture images of the set of physical objects 202-208 and the respective identifiers 212-218. As mentioned above the autonomous robot device 102 can programmed with a map of the first facility 200 and/or can generate a map of the first facility 200 using simultaneous localization and mapping (SLAM). The autonomous robot device 102 can navigate around the first facility 200 based on inputs from the GPS receiver 228, the accelerometer 230, and/or the gyroscope 232. The autonomous robot device 102 can be configured to capture images after an amount of time that elapses between captures, a distance traveled within the first facility 200, continuously, and/or the like. The autonomous robot device 102 can detect like physical objects from the set of physical objects are absent from a first location. For example, the autonomous robot device 102 can capture images of sets of physical objects 202-208. The autonomous robot device 102 can determine from the captured image that the a set of like physical objects 204 is absent from the first location 210. The autonomous robot device 102 can use machine vision to determine the set of like physical objects 204 is absent from the first location. Machine vision can be used to provide imaging-based automatic inspection and analysis of the first facility 200. The autonomous robot device 102 can extract the identifier 214 of the absent set of like physical objects 204 from the captured image using machine vision. The autonomous robot device 102 can transmit the identifier 214 to the first computing system 150 (as shown in FIG. 1). In another embodiment, the autonomous robot device 102 can use an optical scanner 234 to scan the identifier 214 of the absent set of like physical objects 204.

As non-limiting example of embodiments of the present disclosure, the system described above can be embodied as determining out of stock items in a retail store. For example, the first facility 200 can be a retail store and the sets of physical objects 202-208 can be set of items sold at the retail store, disposed at a first storage location. The autonomous robot device 102 can roam around the retail store 200 capturing images sets of items 202-208. The autonomous robot device 102 can also capture images of the identifiers 212-218 associated with the items 202-208. The autonomous robot device 102 can determine a set of like items 204 is not the first storage location by analyzing the captured images using machine vision. The autonomous robot device 102 can extract the identifier 214 of the out-of-stock set of items 104 and transmit the identifier to the first computing system.

In another embodiment, a user can locate and identify out-of-stock items and can scan an identifier associated with the out-stock-items using a hand-held mobile scanner. For example, the user can identify an empty storage location within the retail store where an item is designated to be disposed. The user can scan the identifier associated with the out-of-stock item using a mobile scanner. The mobile scanner can include an optical scanner configured to read optical machine readable representations. The mobile scanner can transmit the identifier to the first computing system via a radiofrequency transmitter included in the mobile scanner. In other embodiments, the mobile scanner can include image capturing device configured to capture an image of the identifier. The mobile scanner can extract the identifier from the captured image and transmit the identifier to the first computing system. In another embodiment, the mobile scanner can transmit the captured image of the identifier to the first computing system. The mobile scanner can be a hand-held device, a wireless device, a portable device, a wearable computer, a cellular or mobile phone, a portable digital assistants (PDAs), a smart phone, a tablets, or an ultrabook.

FIGS. 2B-2C depict images captured by an embodiment of the autonomous robot device 102 and image analysis performed by the autonomous robot device 102 to detect absent physical objects in the storage units according to an exemplary embodiment of the present disclosure. FIG. 2B depicts image 260 and FIG. 2C depicts image 265. As mentioned above, the autonomous robot device can navigate around the facility and detect absent physical objects. With reference to FIG. 2B, for example, physical objects 202 and 206 can be disposed on a shelving unit. The physical object 204 can be absent from the designated location on the as indicated by the vacant space 240 in the image 260. The autonomous robot device can detect the vacant space 240 and indicate the detection of the vacant space 240 in the image 260 by placing a box 242 around the vacant space 240. As one example, the autonomous robot can define a boundary corresponding to an empty shelf space based on changes between adjacent pixels along an x-axis (e.g., horizontal) and a y-axis (e.g., vertical).

With reference to FIG. 2C, the autonomous robot device can also detect identifiers 212-216 associated with the physical objects 202-206 as shown in the image 265. The autonomous robot device can correlate the identifiers to the physical objects. For example, the autonomous robot device can correlate the identifier 212 corresponds to physical object 202, the identifier 216 corresponds to physical object 206 and the identifier 214 corresponds to the vacant space 240 in the image 265. The autonomous robot device can determine the physical object 204 is designated to be disposed in the vacant space 240 based on the identifier 214. Accordingly, the autonomous robot device can determine the physical object 204 is absent from the designated location based on the image 265. The autonomous robot device can transmit the determination to the first computing system.

Figure 2D:
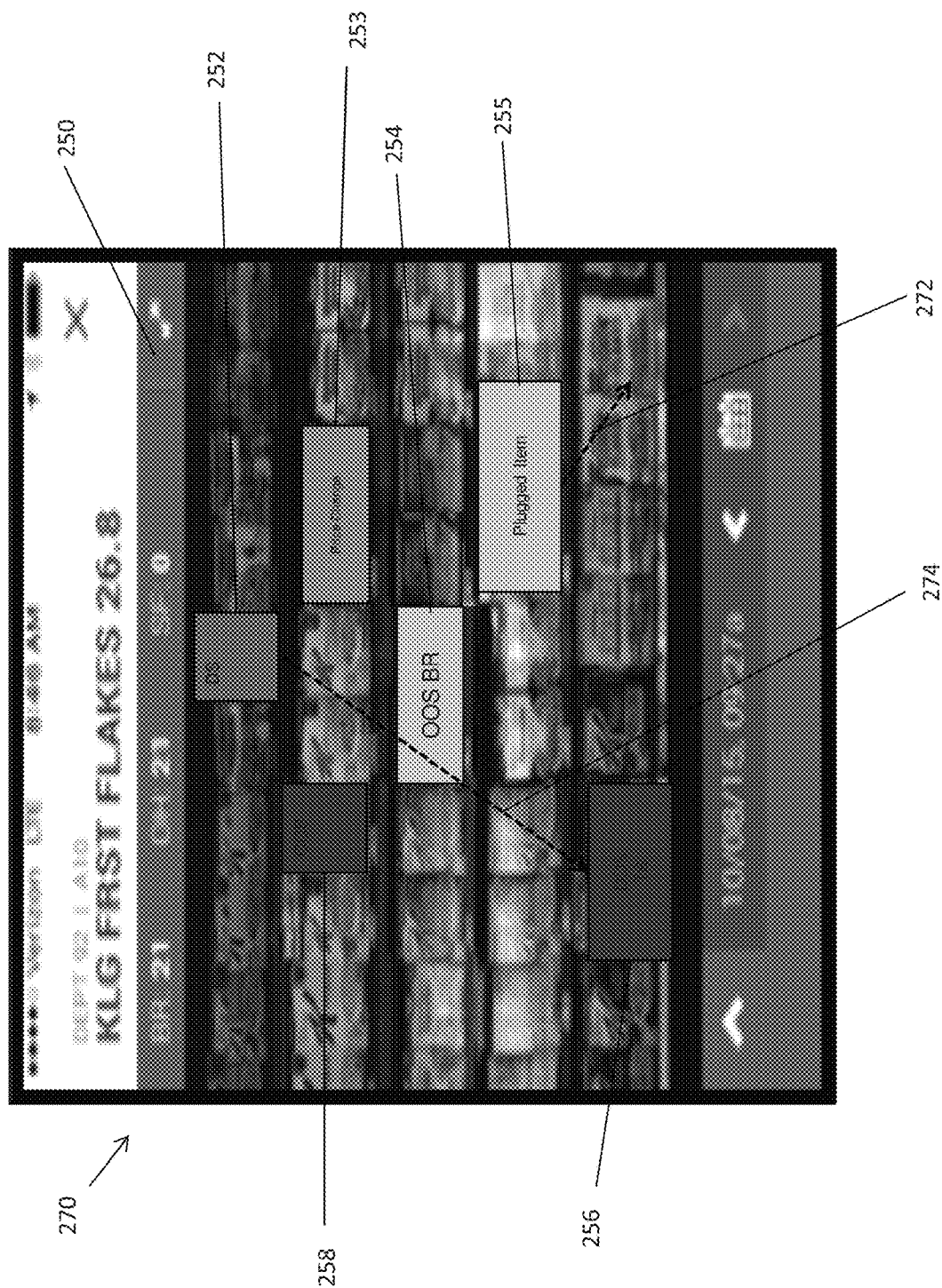
FIG. 2D illustrates an image rendered on a display of a mobile device including information associated with physical objects disposed on a shelving unit according to exemplary embodiments of the present disclosure.

FIG. 2D an image 270 rendered on a display of a mobile device including information associated with physical objects disposed on a shelving unit. As a non-limiting example the autonomous robot device as can detect out of stock items in a retail store. In one embodiment, the mobile device of a retail store associate can display information associated with the out-of-stock items on the display 250 that have been detected by the autonomous robot device. For example, an box 252 can be superimposed over a location on a shelving unit in the image 270 rendered on the display 250. The box 252 can indicate a "Down Stock" item (corresponding to the location), indicating the stock of the item is running low. A box 253 can be superimposed over a location on a shelving unit in the image 270 rendered on the display 250. The box 253 can indicate a change in price of an item corresponding to the location. A box 254 can be superimposed over a location on a shelving unit in the image 270 rendered on the display 250. The box 254 can indicate an out of stock item (corresponding to the location) that has a bin quantity in the backroom (another location within the retail store). A box 255 can be superimposed on a location on a shelving unit in the image 270 rendered on the display 250. The box 255 can indicate the item (corresponding to the location) is in a space of another item (e.g., the label on the shelf does not match the item place on the shelf in the space corresponding to the label). An arrow 272 can indicate a direction to move the item. A box 256 can be can be superimposed on a location on a shelving unit in the image 270 rendered on the display 250. The box 256 can indicate an out of stock item that is in a top shelf location. For example, a down stock item that needs to be moved to a down stock location as indicated by the arrow 274 A box 258 can be superimposed on a location on a shelving unit in the image 270 rendered on the display 250. The box 258 can indicate an out of stock item.

In some embodiments, the autonomous robot device and/or mobile device can scan a shelf using an image capturing device. The autonomous robot device and/or mobile device can identify aisle location within the facility. The autonomous robot device and/or mobile device can transmit an alert that the shelf location do not match and/or the shelf is not assigned. In some embodiments, autonomous robot device can transmit the alert to the mobile device. The shelf can be assigned to the aisle location. The autonomous robot device and/or mobile device can scan the shelf can identify shelf labels. The autonomous robot device and/or mobile device can determine the label sequencing is incorrect based on the image and identification of the shelf labels.

The mobile device can display selectable item information overlaid and/or superimposed on locations of a shelving unit in an image rendered on the display associated with the items on the shelving unit, as described above. The image can be captured by the autonomous robot device or can be captured by the mobile device. For embodiments in which the autonomous robot captures the image, the autonomous robot device can transmit the image to the mobile device after the selectable items have been overlaid on the image by the autonomous robot device or before the selectable items have been overlaid on the image. For images that are sent to the mobile device before the selectable items have been overlaid on the image, the mobile device can be programmed to overlay the selectable items on the image. Based on the selectable item information, the mobile device can determine shelf labels are missing and/or an item is absent from the shelving unit.

In the event an item is absent from the shelving unit the autonomous robot device and/or mobile device can transmit an alert indicating the item is absent, generate an request to retrieve the item from a different location within the facility and generate a request move the item from a top of the shelf (if located on the top of the shelf) to a different location on the shelf. The autonomous robot device and/or mobile device can also determine an item on the top of the shelf that should not be at the top of the shelf based on one more captured images. The autonomous robot device and/or mobile device can generate an request to move the item from the top of the shelf to a different location within the shelving unit. The request can include instructions to not to place the item above a specified height on the shelving unit. The autonomous robot device and/or mobile device can also determine the item on the top of the shelf does not meet a top shelf weight standard and needs to be moved to a different location on the shelving unit based on one or more captured images. The mobile device can also determine whether an item on the shelf should be moved to different areas of the shelving unit.

In some embodiments, the autonomous robot device and/or mobile device can scan a label of bins storing physical objects located in a different location in the facility. The autonomous robot device and/or mobile device can scan items located in the different location and assign the items to bins.

FIG. 3 is a block diagram illustrating an embodiment of the autonomous robot pickers 105 according to exemplary embodiments. The autonomous robot pickers 105 can implemented as shown in FIG. 1. In exemplary embodiments, the autonomous robot picker 105 can be a driverless vehicle, an unmanned aerial craft, and/or the like. As a non-limiting example, upon receiving instructions from the second computing system 120 (as shown in FIG. 1) the autonomous robot picker 105 disposed in a second facility 300 can autonomously navigate through the second facility 300 and locate the like physical objects in the facility included in the instructions received from the second computing system. As shown in FIG. 3, the autonomous robot picker 105 can include an image capturing device 302, motive assemblies 306, a picking unit 304, a controller 318, an optical scanner 330, a drive motor 320, a GPS receiver 322, accelerometer 324 and a gyroscope 326, can navigate autonomously through a second facility 300. The autonomous robot picker 105 can be and intelligent device capable of performing tasks without human control. The drive motor 320 can be operated by the controller 318. The controller 318 can be programmed to control an operation of the image capturing device 302, the optical scanner 330, the drive motor 320, the motive assemblies 306 (e.g., via the drive motor 320), in response to various inputs including inputs from the GPS receiver 322, the accelerometer 324, and the gyroscope 326. The drive motor 320 can control the operation of the motive assemblies 306. In this non-limiting example the motive assemblies 306 are wheels affixed to the bottom end of the autonomous robot picker 105. The motive assemblies 306 can be but are not limited to: tracks, rotors, rotors with blades, and propellers. The motive assemblies 306 can facilitate 360 degree movement for the autonomous robot device 102. The controller 318 can control the image capturing device 302. The image capturing device 302 can be a still image camera or a moving image camera.

The instructions received by the autonomous robot picker 105 can include the coordinates (GPS coordinates, facility-specific coordinates, etc.) at which the like physical objects are disposed in the second facility 300 and the quantity of like physical objects needed by the first facility. The autonomous robot picker 105 can autonomously navigate to the storage location 314 at which the like physical objects 204 are disposed. The autonomous robot picker 105 can navigate throughout the first facility using the GPS receiver 322, accelerometer 334 and gyroscope 336. The GPS receiver 228 can be a L-band radio processor capable of solving the navigation equations in order to determine a position of the autonomous robot device 102, determine a velocity and precise time (PVT) by processing the signal broadcasted by GPS satellites. The accelerometer 230 and gyroscope 232 can determine the direction, orientation, position, acceleration, velocity, tilt, pitch, yaw, and roll of the autonomous robot device 102. In exemplary embodiments, the controller can implement one or more algorithms, such as a Kalman filter, for determining a position of the autonomous robot picker 105.

Upon finding the like physical objects 204 in the storage location 314 in the second facility 300, the autonomous robot picker 105 can use the picking unit 304 to pick up the like physical objects 204. In some embodiments, the autonomous robot picker 105 can correlate the identifiers to the physical objects. For example, the autonomous robot picker 105 can correlate the identifier 214 to the physical object 204. The autonomous robot picker 105 can pick up the number of like physical objects 204 as needed by the first facility. The autonomous robot picker 105 can carry the like physical objects 204 to the conveyer belt 195, which can transport the like physical objects along the path 316.

In another embodiment, the autonomous robot picker 105 may include an optical scanner 330 coupled to the controller 318 configured to read the identifiers 212-218 associated with the sets of physical objects 202-208. The autonomous robot picker 105 can receive the identifier 214 of the desired physical object 204 in the instructions received from the second computing system. The autonomous robot picker 105 can locate the like physical objects 204 by reading the corresponding identifier 214.

The conveyer belt 195 can be disposed on a belt carrier 310 which may also include rollers (e.g., friction and drive rollers) and a drive motor. The driver motor can control one or more of the rollers to rotate the belt to provide a transport for the like physical objects 204 from one end of the belt carrier 310 to an opposite end of the belt carrier 310. A vehicle can be disposed at the distal end of the belt carrier 310 to receive the like physical objects 204 as they are transported by the conveyer belt 195. The vehicle can transport the like physical objects from the second facility to the first facility.

As a non-limiting example, embodiments of the system described above can be embodied as a retail store warehouse. For example, the second facility can be a warehouse or distribution center storing items sold at the retail store (e.g., the first facility as shown in FIG. 2) and the physical objects can be items stored in the warehouse. The autonomous robot picker 105 can receive instructions associated with the need for replenishment of an out of stock item at a the retail store. The instructions can include the item description, the coordinates of the item in the warehouse, the identifier of the item 214 and the quantity of items needed by the first facility. The autonomous robot picker 105 can locate the items in the storage location using the coordinates or by reading the identifier, pick-up the number of items needed by the first facility using the picking unit 190 and load the items onto the conveyer belt 195. In some embodiments A vehicle can be parked at the distal end of the conveyer belt 195 configured to receive the items. The vehicle can transport the items from the warehouse to the retail store.

In another embodiment, a user in the warehouse can receive the data associated with the of the out-of-stock items 104 on a mobile scanner. The data may include the product name, description, identifier, coordinates (GPS coordinates, facility-specific coordinates, etc.) at which the like physical objects are disposed in the second facility and quantity of items needed by the retail store. The mobile scanner can include a GPS receiver, accelerometer and gyroscope. The user can locate the items using the mobile scanner. The mobile scanner can provide navigation throughout the second facility using the GPS receiver, accelerometer and gyroscope. The GPS receiver can be a L-band radio processor capable of solving the navigation equations in order to determine a position of the mobile scanner, determine a velocity and precise time (PVT) by processing the signal broadcasted by GPS satellites. The accelerometer and gyroscope can determine the direction, orientation, position, acceleration, velocity, tilt, pitch, yaw, and roll of the mobile scanner. Upon locating the items the user can pick up and place the items on the conveyer belt 195.

The mobile scanner can be a hand-held device, a wireless device, a portable device, a wearable computer, a cellular or mobile phone, a portable digital assistants (PDAs), a smart phone, a tablets, or an ultrabook.

Figure 4:
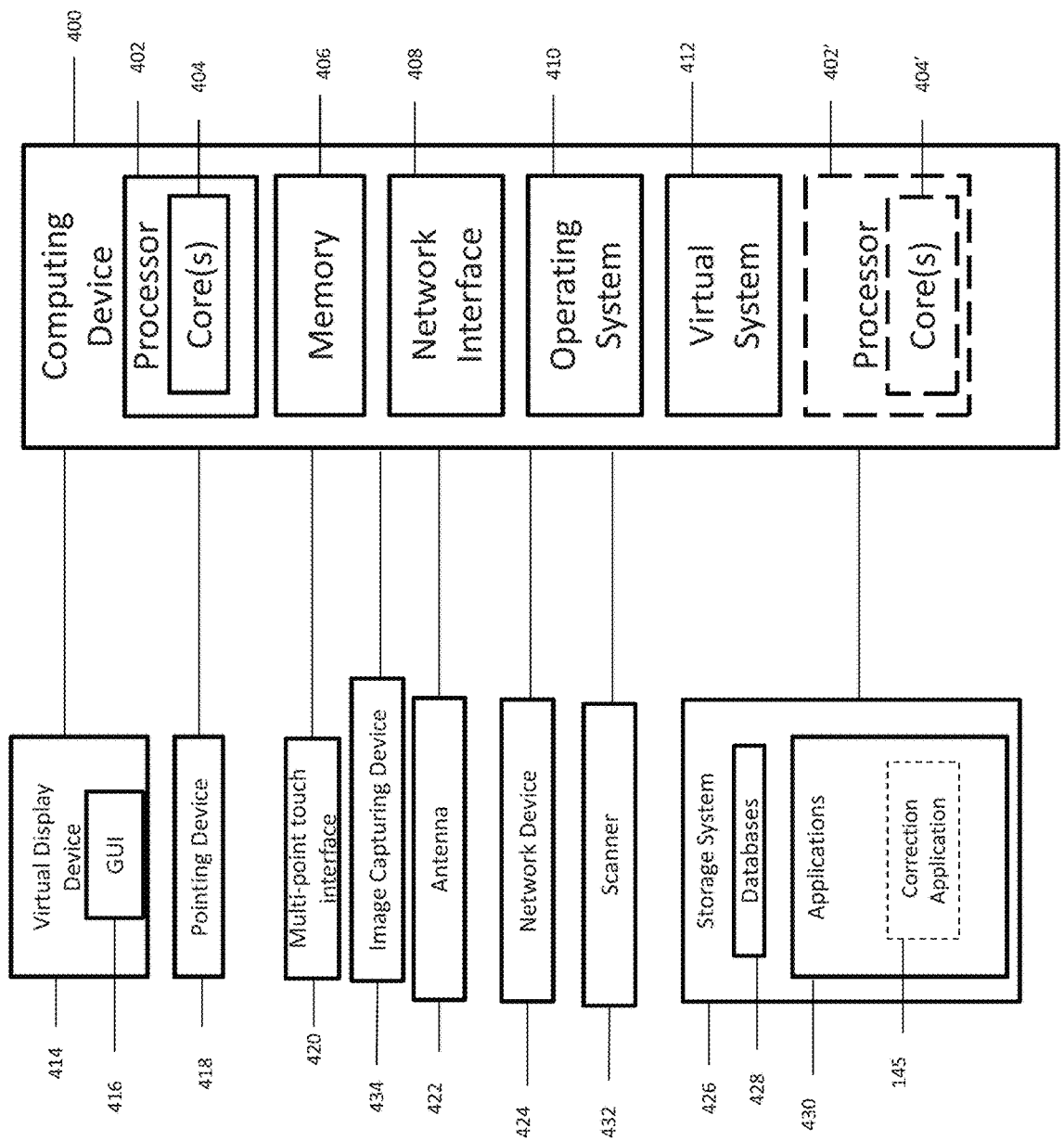
FIG. 4 is a block diagram of an example computing device in an autonomous robot system according to exemplary embodiments of the present disclosure.

FIG. 4 is a block diagram of an example computing device for implementing exemplary embodiments of the present disclosure. Embodiments of the computing device 300 can implement embodiments of the first computing system 150, the second computing system 120, and/or the intermediate computing system 197. The computing device 400 includes one or more non-transitory computer-readable media for storing one or more computer-executable instructions or software for implementing exemplary embodiments. The non-transitory computer-readable media may include, but are not limited to, one or more types of hardware memory, non-transitory tangible media (for example, one or more magnetic storage disks, one or more optical disks, one or more flash drives, one or more solid state disks), and the like. For example, memory 406 included in the computing device 400 may store computer-readable and computer-executable instructions or software (e.g., applications 430) for implementing exemplary operations of the computing device 400. The computing device 400 also includes configurable and/or programmable processor 402 and associated core(s) 404, and optionally, one or more additional configurable and/or programmable processor(s) 402' and associated core(s) 404' (for example, in the case of computer systems having multiple processors/cores), for executing computer-readable and computer-executable instructions or software stored in the memory 406 and other programs for implementing exemplary embodiments of the present disclosure. Processor 402 and processor(s) 402' may each be a single core processor or multiple core (404 and 404') processor. Either or both of processor 402 and processor(s) 402' may be configured to execute one or more of the instructions described in connection with computing device 400.

Virtualization may be employed in the computing device 400 so that infrastructure and resources in the computing device 400 may be shared dynamically. A virtual machine 412 may be provided to handle a process running on multiple processors so that the process appears to be using only one computing resource rather than multiple computing resources. Multiple virtual machines may also be used with one processor.

Memory 406 may include a computer system memory or random access memory, such as DRAM, SRAM, EDO RAM, and the like. Memory 406 may include other types of memory as well, or combinations thereof.

A user may interact with the computing device 400 through a visual display device 414, such as a computer monitor, which may display one or more graphical user interfaces 416, multi touch interface 420, an image capturing device 434, a scanner 432 and a pointing device 418. The scanner 432 may be a barcode reader or RFID reader configured to read optical machine readable representations such as barcodes, QR codes and RFID tags.

The computing device 400 may also include one or more storage devices 426, such as a hard-drive, CD-ROM, or other computer readable media, for storing data and computer-readable instructions and/or software that implement exemplary embodiments of the present disclosure (e.g., applications). For example, exemplary storage device 426 can include one or more databases 428 for storing information regarding the physical objects. The databases 428 may be updated manually or automatically at any suitable time to add, delete, and/or update one or more data items in the databases.

The computing device 400 can include a network interface 408 configured to interface via one or more network devices 424 with one or more networks, for example, Local Area Network (LAN), Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections, controller area network (CAN), or some combination of any or all of the above. In exemplary embodiments, the computing system can include one or more antennas 422 to facilitate wireless communication (e.g., via the network interface) between the computing device 400 and a network and/or between the computing device 400 and other computing devices. The network interface 408 may include a built-in network adapter, network interface card, PCMCIA network card, card bus network adapter, wireless network adapter, USB network adapter, modem or any other device suitable for interfacing the computing device 400 to any type of network capable of communication and performing the operations described herein.

The computing device 400 may run any operating system 410, such as any of the versions of the Microsoft® Windows® operating systems, the different releases of the Unix and Linux operating systems, any version of the MacOS® for Macintosh computers, any embedded operating system, any real-time operating system, any open source operating system, any proprietary operating system, or any other operating system capable of running on the computing device 400 and performing the operations described herein. In exemplary embodiments, the operating system 410 may be run in native mode or emulated mode. In an exemplary embodiment, the operating system 410 may be run on one or more cloud machine instances.

The processes described herein may be executed by one or more application(s) 430. For example, for embodiments in which the computing device 400 correspond to the second computing system 120, the computing device 400 may execute the applications 430 such as the Correction application 145 to correct the perpetual inventory error and transmit the corrected perpetual inventory to the first computing system 150.

Figure 5:
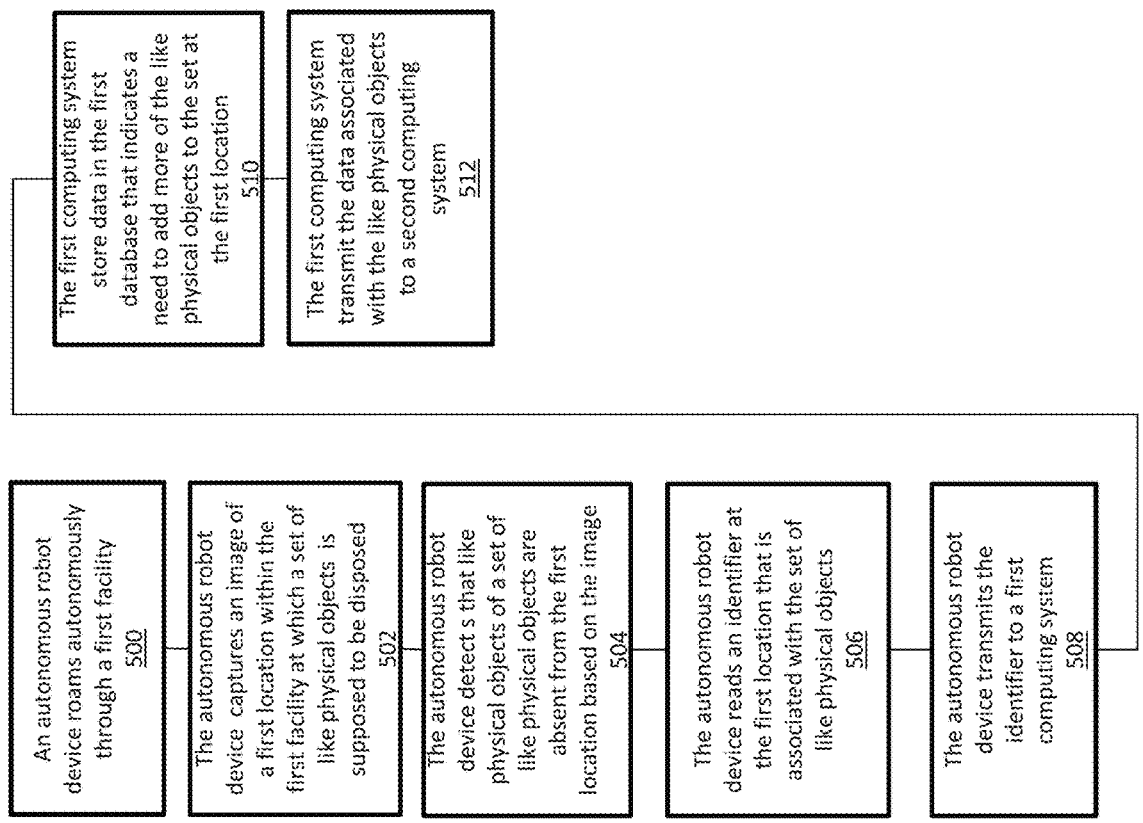
FIG. 5 is a flowchart illustrating an exemplary process implemented by an exemplary autonomous robot system in accordance with exemplary embodiments of the present disclosure.

FIG. 5 is a flowchart illustrating an exemplary process in an autonomous robot system in accordance with exemplary embodiments of the present disclosure. In exemplary embodiments, in operation 500, at least one autonomous robot device (e.g., the autonomous robot 102 as shown in FIGS. 1 and 2) autonomously roams through a first facility (e.g., the first facility 200 as shown in FIG. 2).

In operation 502 the autonomous robot device captures an image of a first location (e.g., the first location 210 as shown in FIG. 2) within the first facility at which a set of like physical objects (e.g. physical objects 202-208 as shown in FIG. 2) is supposed to be disposed. The autonomous robot device also captures images of the identifiers (e.g., the identifiers 212-218 as shown in FIG. 2) associated with the like physical objects.

In operation 504, the autonomous robot device can detect that like physical objects of a set of like physical objects are absent from the first location based on the captured image(s). The autonomous robot device can use machine vision to determine that the like physical objects are absent from the set of like physical objects supposed to be disposed at the first location. In operation 506, the autonomous robot device can reading an identifier at the first location that is associated with the set of like physical objects. The autonomous robot device can extract the identifier from the captured image. In operation 508, the autonomous robot device can transmit the identifier to a first computing system (e.g., the first computing system 150 as shown in FIG. 1).

In operation 510, the first computing system can store data in the first database that indicates a need to add more of the like physical objects to the set at the first location. The first computing system can determine the like physical objects are absent throughout the first facility. In another embodiment, the first computing system can determine the like physical objects are present at a second location within the first facility.

In operation 512, upon execution of an automated batch file, the first computing system can transmit the data associated with the like physical objects stored in the first database from the first computing system to a second computing system (e.g., the second computing system 120 as shown in FIG. 1).

Figure 6:
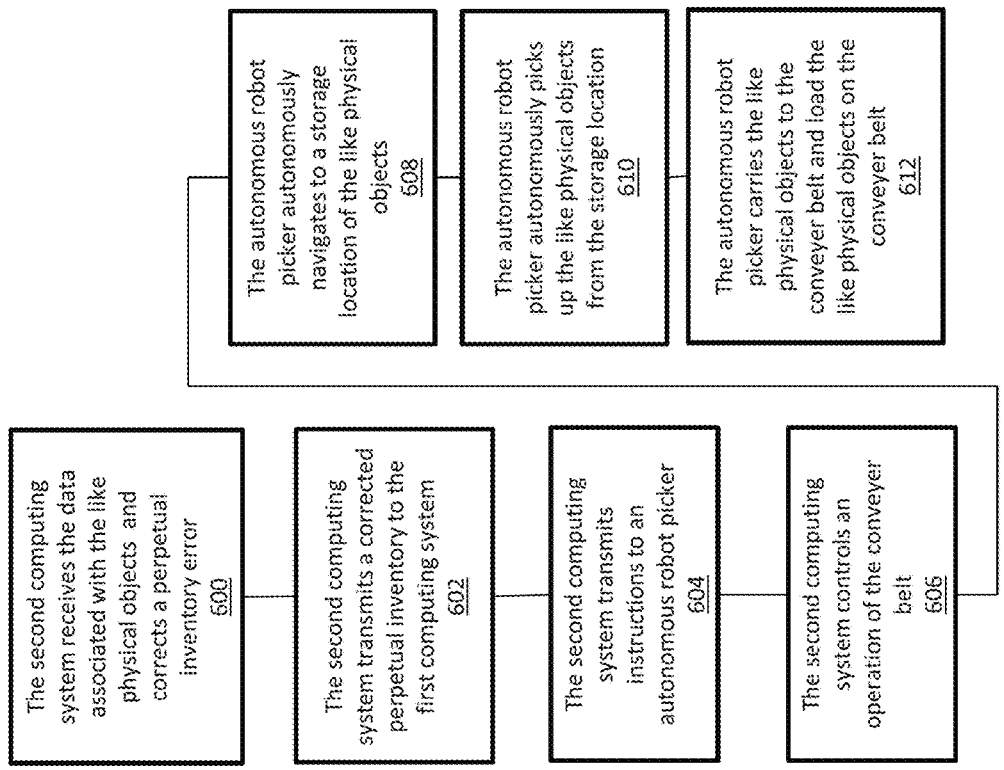
FIG. 6 a flowchart illustrating an exemplary process in an autonomous robot system in accordance with exemplary embodiments of the present disclosure.

FIG. 6 a flowchart illustrating an exemplary process in an autonomous robot system in accordance with exemplary embodiments of the present disclosure. In operation 600, the second computing system can receive the data associated with the like physical objects at the second computing system and correct a perpetual inventory error associated with the first facility based at least in part on the data associated with the like physical objects received from the first computing system. The perpetual inventory can reflect the inventory of the like physical objects available at the first facility. The second computing system can calculate a perpetual inventory error and correct the perpetual inventory error to reflect the actual inventory of the like physical objects in the first facility. In operation 602 the second computing system can transmit a corrected perpetual inventory to the first computing system.

In operation 604, the second computing system transmit instructions to an autonomous robot picker (e.g., the autonomous robot picker 105 as shown in FIGS. 1 and 3) disposed in a second facility (e.g., the second facility 300 as shown in FIG. 3) in response to correction of the perpetual inventory error. The instructions can include data associated with the like physical objects such as a name of the like physical objects, a description of the like physical objects, coordinates at which the like physical objects are stored in the second facility, the identifier associated with the like physical objects, and a quantity of the like physical objects needed at the first facility. In operation 606, the second computing system can control an operation of the conveyer belt (e.g., the conveyor belt 195 as shown in FIGS. 1 and 3) disposed in the second facility.

In operation 608, the autonomous robot picker can autonomously navigate to a storage location (e.g., the storage location 314 as shown in FIG. 3) of the like physical objects in response to the instructions. The autonomous robot picker can use the coordinates to locate the like physical objects or the autonomous robot picker can read the identifiers to locate the like physical objects. In operation 610, the autonomous robot picker can autonomously pick up the like physical objects using the picking unit from the storage location. In operation 612, the autonomous robot picker can carry the like physical objects to the conveyer belt and load the like physical objects on the conveyer belt.

Exemplary flowcharts are provided herein for illustrative purposes and are non-limiting examples of methods. One of ordinary skill in the art will recognize that exemplary methods may include more or fewer steps than those illustrated in the exemplary flowcharts, and that the steps in the exemplary flowcharts may be performed in a different order than the order shown in the illustrative flowcharts.

We claim:

1. An autonomous distributed computing system comprising:
   a first computing system including at least one server and a first database;
   a plurality of autonomous robot devices in selective communication with the first computing system via a first communications network, at least one of the plurality of autonomous robot devices including a controller, a drive motor, and an image capturing device,
   the at least one of the autonomous robot devices configured to (i) roam autonomously through a facility in response to operation of the drive motor by the controller, (ii) capture a set of one or more images of a first set of items disposed at a first location within the facility, (iii) identify the first set of physical objects disposed at the first location based on the set of one or more images, (iv) scan a machine-readable element encoded with an identifier element disposed on a label at the first location, (v) determine the identifier is associated with a second set of physical objects in response to querying the first database, (vi) determine the first location in which the first set of physical objects are disposed is a designated location for the second set of physical objects, (vii) determine the second set of physical objects are absent from the facility, (viii) transmit the identifier associated with the second set of physical objects to the first computing system; and
   a second computing system in selective communication with the first computing system via a second communications network, the second computing system including a second database and being located remotely from the first computing system,
   wherein the first computing system is programmed to (i) determine that the machine-readable element at the first location has been read more than a specified quantity of time within a specified time period, (ii) store data in the first database that indicates a need to add more of the second set of physical objects to the set at the first location in response to receipt of the identifier from the at least one of the autonomous robot devices, and (iii) upon execution of an automated batch file, transmit the data associated with the second set of physical objects stored in the first database to the second computing system; and
   wherein the second computing system is programmed to (i) receive the data associated with the second set of physical objects, (ii) correct a perpetual inventory error based on the data associated with the second set of physical objects, and (iii) transmit a corrected perpetual inventory to the first computing system.

2. The system of claim 1, wherein the at least one of the autonomous robot devices is configured to identify the first set of physical objects in the first set of images using machine vision.

3. The system in claim 1, wherein the first computing system determines the second set of physical objects are present in a second location within the facility.

4. The system in claim 1, wherein the first computing system deletes the data associated with readings of the machine-readable element at the first location after the specified quantity of times within the specified time period.

5. The system in claim 1, wherein the at least at least one of the autonomous robot devices including an optical machine scanner.

6. The system in claim 5, wherein the machine-readable element is an optical machine readable representation and the controller of at least one of the autonomous robot devices controls the optical machine scanner to scan and decode the identifier from the machine-readable element.

7. The system in claim 1, wherein the first computing system is configured to determine that the same machine-readable element has been read by two of the plurality of autonomous robot devices within a specified time period.

8. The system in claim 7, wherein the first computing system deletes subsequent reads from the plurality of autonomous robot devices within the specified time period.

9. The system of claim 1, wherein the second computing system corrects the perpetual inventory error associated with the second set of physical objects in response to determining the second set of physical objects are absent from the first location in the facility and a second location in the facility at which a third set of like physical objects are stored.

10. The system of claim 9, wherein prior to the second computing system correcting the perpetual inventory error, a perpetual inventory associated with the facility indicates at least one of the second set of physical objects are present in the facility.

11. An autonomous distributed computing system comprising:
    a first computing system including at least one server and a first database disposed in a first facility;
    a plurality of autonomous robot devices disposed in the first facility and in selective communication with the first computing system, at least one of the autonomous robot devices configured to: (i) detect a first set of physical objects are disposed at a designated location for a second set of physical objects, (ii) determine the second set of physical objects are absent from the facility, and (ii) transmit data indicative of absence of the second set of physical objects to the first computing system;
    a plurality of autonomous robot pickers including at least one processor disposed in a second facility;
    a conveyer belt disposed in the second facility;
    a second computing system including at least one server and a database, communicatively coupled to the first computing system, the plurality of autonomous robot pickers, and the conveyer belt, wherein the second computing system located remotely from the first computing system;
    the second computing system configured to: (i) receive from the first computing system, the data indicative of absence of the second set of physical objects associated with the second set of physical objects disposed at the first location within the first facility; (ii) correct a perpetual inventory error associated with the first facility based at least in part on the data, (iii) transmit instructions to at least one of the plurality of autonomous robot pickers in response to correction of the perpetual inventory error; and (iv) control an operation of the conveyer belt;

wherein the at least one of the plurality of autonomous robot pickers is configured to: (i) autonomously navigate to a storage location of the second set of physical objects in response to the at least one autonomous robot device detecting the absence of like the physical objects from the first location within the first facility and receiving instructions from the second computing system; (ii) autonomously control a picking unit of the at least one of the plurality of robot pickers to remove at least one of the second set of physical objects from the storage location, and (iii) autonomously control the picking unit to place at least one of the second set of physical objects on the conveyer belt to transport the at least one of the second set of physical objects from the storage location to a distribution location.

12. The system of claim 11, wherein the data associated with the second set of physical objects includes a quantity of the second set of physical objects needed at the first location.

13. The system of claim 11, wherein the second computing system corrects the perpetual inventory error in response to determining the second set of physical objects are absent from the first location in the facility and are absent from a second location in the first facility at which a third set of like physical objects are stored.

14. The system of claim 13, wherein prior to the second computing system correcting the perpetual inventory error, a perpetual inventory associated with the second set of physical objects indicates that at least one of the second set of physical objects are present at the first location or the second location.

15. The system of claim 11, wherein the at least one of the second set of physical objects is transported into a vehicle by the conveyor belt.

16. The system of claim 15, wherein the second computing system verifies the vehicle is present at the distal end of the conveyer belt before transmitting instructions to the at least one of the autonomous robot pickers.

17. A method implemented by an autonomous distributed computing system, the method comprising:
 roaming autonomously through a first facility by an autonomous robot device that includes a controller, a drive motor, and an image capturing device, the autonomous robot device roaming the facility in response to operation of the drive motor by the controller;
 capturing, via the image capturing device of the autonomous robot device, a set of one or more of images of a first set of physical objects disposed at a first location within the first facility;
 identifying, via the autonomous robot device, the first set of physical objects disposed at the first location based on the set of one or more images;
 scanning, via the autonomous robot device, a machine-readable encoded with an identifier element disposed on a label at the first location;
 determining, by the autonomous robot device, the identifier is associated with a second set of physical objects in response to querying the first database;
 determining, by the autonomous robot device, the second set of physical objects are absent from the facility;
 transmitting, via the at least one of the autonomous robot devices, the identifier associated with the second set of physical objects to the first computing system;
 storing, via the first computing system, data in the first database that indicates a need to add more of the second set of physical objects to the set at the first location in response to receipt of the identifier from the autonomous robot device;
 upon execution of an automated batch file, transmitting the data associated with the second set of physical objects stored in the first database from the first computing system to a second computing system, the second computing system be located remotely from the first computing system;
 receiving the data associated with the second set of physical objects at the second computing system;
 correcting, via the second computing system, a perpetual inventory error associated with the first facility based at least in part on the data associated with the second set of physical objects;
 transmitting, via the second computing system, a corrected perpetual inventory to the first computing system;
 transmit instructions from the second computing system to an autonomous robot picker disposed in a second facility in response to correction of the perpetual inventory error;
 controlling, via the second computing system, an operation of a conveyer belt disposed in the second facility;
 autonomously navigating to a storage location of the second set of physical objects in the second facility by autonomous robot picker in response to the instructions;
 autonomously controlling by the autonomous robot picker, a picking unit of the autonomous robot picker to remove at least one of the second set of physical objects from the storage location; and
 autonomously controlling the picking unit to place the at least one of the second set of physical objects on the conveyer belt to transport the at least one of the second set of physical objects from the storage location to a distribution location in the second facility.

18. The method of claim 17, wherein correcting the perpetual inventory error associated with the second set of physical objects is performed in response to determining the second set of physical objects are absent from the first location in the first facility and a second location in the first facility at which a second set of like physical objects are stored.

19. The method of claim 17, wherein prior to the second computing system correcting the perpetual inventory error, a perpetual inventory associated with the facility indicates at least one of the second set of physical objects is present in the first facility.

20. The method in claim 17, further comprising determining, via the first computing system, the same identifier has been read by two of the plurality of autonomous robot devices within a specified time period.

* * * * *